July 2, 1935.	S. G. RUSSELL ET AL	2,006,482
SPRING WIND FISHING REEL
Filed Aug. 30, 1934	2 Sheets-Sheet 1

INVENTORS
Samuel G. Russell
Frank Burdick
BY Chappell & Earl
ATTORNEYS

INVENTORS
Samuel G. Russell
Frank Burdick
BY Chappell Earl
ATTORNEYS

Patented July 2, 1935

2,006,482

UNITED STATES PATENT OFFICE 2,006,482

SPRING WIND FISHING REEL

Samuel G. Russell and Frank Burdick, Kalamazoo, Mich., assignors to Shakespeare Company, Kalamazoo, Mich.

Application August 30, 1934, Serial No. 742,037

29 Claims. (Cl. 242—84.3)

The main objects of this invention are:

First, to provide an improved spring winding or automatic fishing reel which is very convenient to manipulate both in the matter of winding and releasing the driving spring.

Second, to provide in an automatic or spring winding fishing reel an improved brake mechanism.

Third, to provide in a spring wind or automatic fishing reel an improved spool structure which is economical in its parts and has a friction connection to the driving means.

Fourth, to provide an improved automatic reel having these advantages which is very simple in its parts and the parts are easily assembled.

Objects pertaining to details and economies of our invention will definitely appear from the description to follow. The invention is defined in the claims.

A structure embodying the features of our invention is clearly illustrated in the accompanying drawings, in which.

Figure 1:
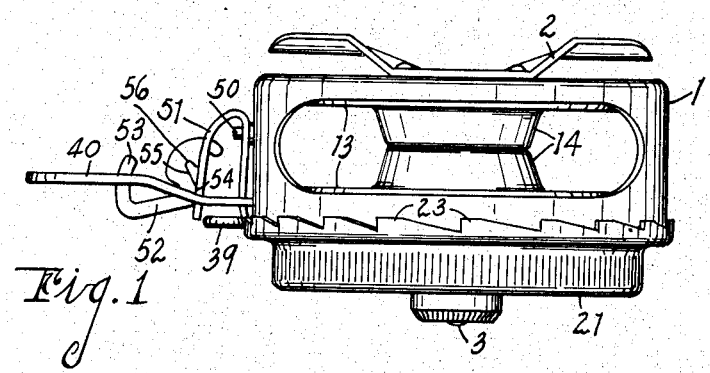
Fig. 1 is a side elevation of our improved fishing reel in inverted position, which is the position in which it is commonly mounted upon a fishing rod.
Figure 2:
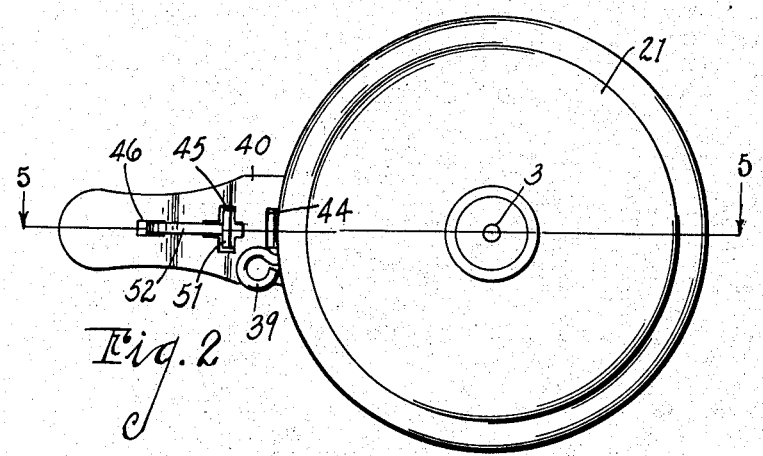
Fig. 2 is a top view.

Referring to the drawings, we provide a casing or housing member 1, preferably cup-like and formed as a stamping or drawn piece. The reel seat 2 is secured to the bottom of this casing 1, as is also the spindle 3, the spindle being disposed centrally of the casing and having a reduced portion 4 arranged through the washer-like members 5 and 6 arranged on the inner and outer sides of the bottom of the casing 1 to reinforce the same and provide a support for the spindle. The outer end of the spindle being riveted or upset upon the outer member 6.

Rotatable upon the spindle is a tubular spool shaft 7 which in the embodiment illustrated is provided with an integral spool pinion 8. This spool pinion forms a shoulder for the spool hub member 9. The second spool hub member 10 is arranged in abutting relation with the hub member 9 and the parts are clamped together by means of the nut 11 threaded upon the shaft. These members 9 and 10 are preferably duplicates as a matter of manufacturing economy. The hub members are provided with flanges 12 disposed in spaced opposed relation. The spool flanges 13 have inward offsets 14 from which extend a pair of friction flanges 15 disposed between the hub flanges and coacting with the resilient friction disks 16 which are disposed between and supported by the hub flanges in frictional clamping engagement with the friction members of the spool flanges.

This arrangement provides an effective driving connection without the necessity of splining and accurately fitting the parts, and at the same time allows relative rotation of the spool shaft and the spool flanges which constitute the spool proper under unusual stresses or conditions.

The gear plate 17 is also preferably a stamping and is cupped to provide a housing for part of the gears. This gear plate has an outwardly projecting flange-like rim 18 and the flange has a plurality of radial tongues 19 engaging slot-like recesses 20 in the edge of the casing 1 so that the gear plate is accurately positioned and its rotative movement prevented.

The spring drum or casing 21 is provided with an outwardly offset flange 22 which embraces the edge of the casing 1 and overhangs the end of the casing 1. This flange 22 is provided with an annular series of ratchet teeth 23. The spring 24 is secured at its outer end 25 to the spring drum, its inner coil 26 embracing the hub 27 of the driving gear 28. This hub is arranged upon the spindle 3 at the end of the spool shaft and is also supported by the bearing member 29 on the gear plate, see Fig. 5.

Figure 7:
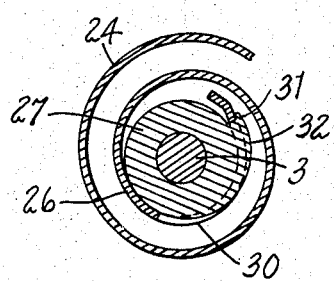
Fig. 7 is an enlarged fragmentary section on line 7—7 of Fig. 5 showing the manner of detachably connecting the motor spring to the driving element.

The inner coil 26 of the spring has a longitudinal slot 30 engaging the lug 31 on the hub 27, the hub having a spirally curved or cammed surface 32 leading to the lug so that when the hub is rotated in clockwise direction, as viewed in Fig. 7, the spring is automatically disengaged from the lug. Upon rotation in the opposite direction the lug automatically engages the spring.

With this automatic engagement and release of the spring, danger of breakage of the spring is minimized and, further, this form of connection is of great advantage in assembling of the parts.

The gear 28 meshes with a pinion 33 on the stub shaft 34. This pinion is connected with the gear 35 meshing with the spool pinion 8, thereby providing a driving connection for the spring to the spool.

The pawl 36 is preferably formed of a piece of spring wire, and has a bowed spring arm 37 secured at 38 to the gear plate, the arm being curved to correspond to the curvature of the casing. This permits use of a spring arm of considerable length without interfering with the internal mechanism of the reel. The pawl is provided with a finger piece 39 which in the structure illustrated is a circular loop in the outer end of the pawl.

Figures 3, 4:
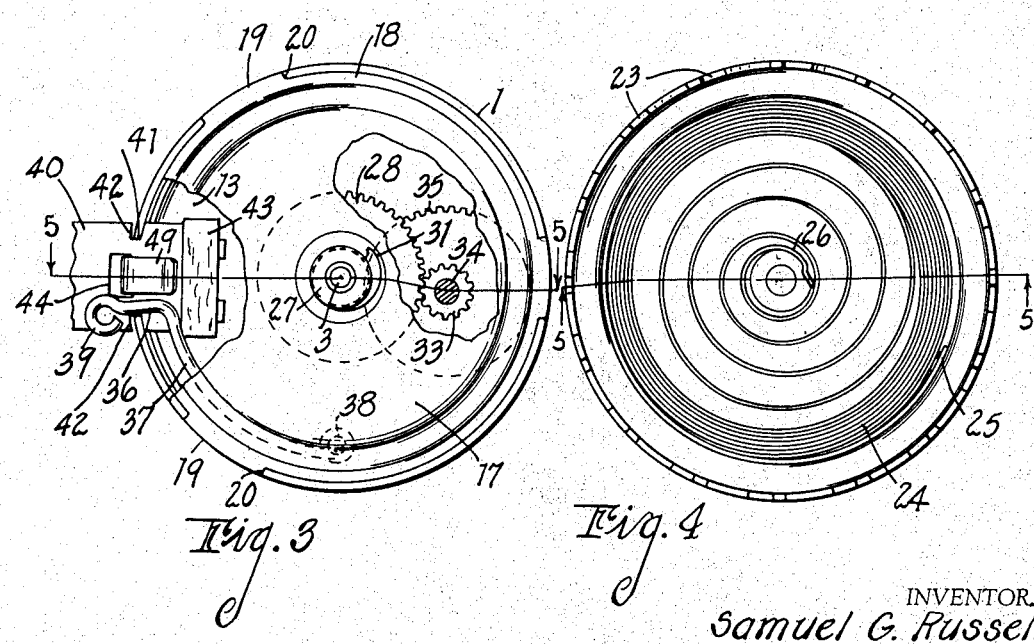
Fig. 3 is a plan view with the spring case or drum removed, parts of the gear plate and brake lever being broken away to show the relation of the parts.
Fig. 4 is an inside view of the spring drum or case with the motor spring therein.

The brake lever 40 is arranged through an opening 41 in the edge of the casing and has opposed notches 42 engaging the casing so that the lever is rockingly or pivotally supported without further pivot means, see Fig. 3. This inner end of the lever is provided with a shoe or friction facing 43. This lever in the embodiment illustrated has three holes 44, 45 and 46. The inner arm 47 of the U-shaped or bowed spring 48 is arranged through the inner hole 44 and terminates in a laterally turned finger or end portion 49 engaging the brake lever.

The inner arm of the brake actuating spring is engaged with a stud 50 and the outer arm 51 of the spring is arranged through the intermediate hole 45 of the lever. This hole 45 is preferably T shaped and is designed to receive the latch 52 which has a finger piece 53 disposed in the outer hole 46 of the lever. The spring acts to hold the latch in assembled position. The outer arm of the spring engages the flat surface 54 of the latch when the latch is released and the flat surface 55 when the latch is engaged, thereby preventing the latch from accidentally shifting.

Figure 5:
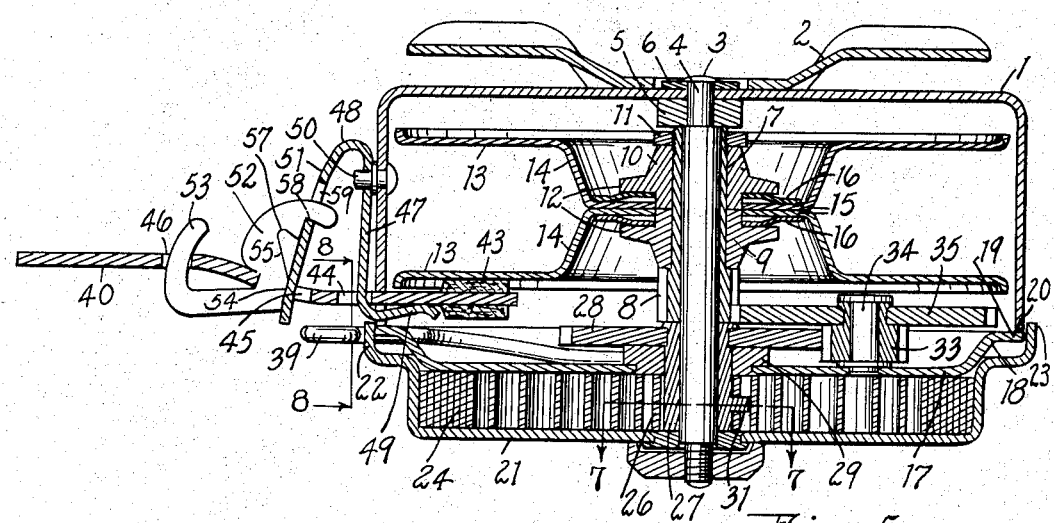
Fig. 5 is an enlarged view mainly in vertical central section on a line corresponding to line 5—5 of Figs. 2, 3, 4 and 8 with the brake in engaged position.
Figure 6:
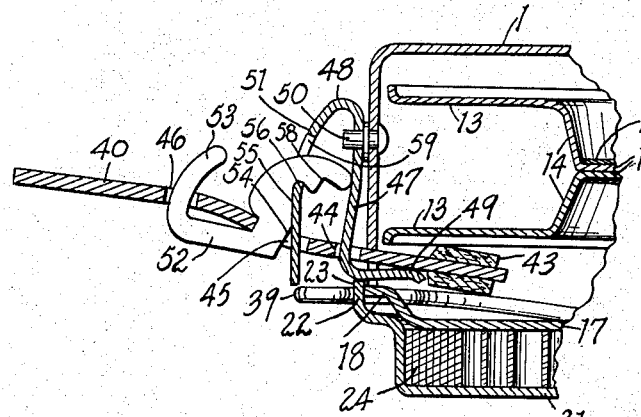
Fig. 6 is an enlarged fragmentary section corresponding to that of Fig. 5 with the brake locked in disengaged position.
Figure 8:
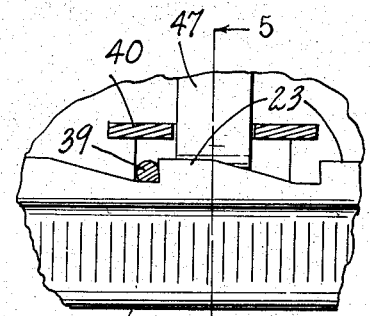
Fig. 8 is an enlarged fragmentary view partially in section on line corresponding to line 8—8 of Fig. 5.

The latch has a notch or recess 56 engaging the outer arm when the latch is on thereby holding the lever in brake releasing position. When the notch 58 of the latch is engaged with the outer arm as shown in Fig. 5, the brake is in engaging position and may be manually released or applied by the operator as may be desired. The outer arm of the spring is provided with a slot 59 receiving the latch, the lower end of the slot coacting with the notches or keepers. The pawl 36 preferably lies below the lever. The parts are thus all positioned so as to be conveniently manipulated and the brake lever constitutes a guard for the pawl so that the pawl is not likely to be accidentally released. However, the pawl can be readily manipulated when it is desired to unwind or partially unwind the spring.

Our improved reel is very simple and economical in its parts and the parts may be very easily assembled. The structure is especially designed to provide an efficient, strong and durable reel at relatively low cost.

In use, a fishing line (not shown) is attached at its inner end to the spool and wound thereon by giving the spring drum 21 a few turns to tighten the spring 24, and then actuating the brake lever 40 to release the friction facing 43 from the spool flange 13, the line being allowed to run through the fingers to suitably tension the winding of the line on the spool by the spring. This operation is repeated until the line is wound on the spool.

In casting, the residual tension of the spring 24 is first relaxed by actuating the finger piece 39 to disengage the pawl 36 from the ratchet teeth 23 of the spring drum 21, the reverse movement of the drum by the spring being restrained with the hand. The brake lever is then latched with the friction facing out of engagement with the spool flange 13, and the cast made. The line may be manually withdrawn from the reel in a similar manner, or by merely releasing the brake, the spool being free to turn on its hub, when the spring is wound, and sufficient force is applied to overcome the friction of the resilient friction disks 16.

With the line out, the brake is set, and the spring 24 is wound by turning the spring drum 21, the pawl 36 cooperating with the ratchet teeth 23 to prevent reverse rotation of the drum. Thus, when a fish takes the line, the spring tends to rotate the spool to keep sufficient tension in the line to prevent the fish from freeing itself from the hook, the effective force of the spring being controlled by manipulating the brake lever. As the spring unwinds in reeling in the line, the spring drum may be given a few added turns to tighten the spring to insure sufficient line tension to land the fish. The action of the resilient friction disks 16 in allowing rotation of the spool relative to the spool hub prevents the fish from breaking the line by unwinding the spool beyond the fully wound status of the spring.

We have illustrated and described our invention in an embodiment which we regard as highly satisfactory. We have not attempted to illustrate or describe certain modifications or adaptations as it is believed that this disclosure will enable those skilled in the art to which our invention relates to embody or adapt the same as may be desired.

Having thus described our invention what we claim as new and desire to secure by Letters Patent is:

1. In a fishing reel, the combination of a casing, a spindle, a spool shaft on said spindle, a pair of spool hub members sleeved upon said shaft and having spaced opposed flanges, said shaft being provided with a pinion constituting a supporting shoulder for one of said hub members, a nut threaded upon said shaft in supporting engagement with the other hub member, a pair of coacting spool flanges having inwardly offset central friction members disposed in abutting relation between said hub flanges, and friction driving disks disposed between said hub flanges and said friction members of said spool flanges.

2. In a fishing reel, the combination of a casing, a spindle, a spool shaft on said spindle, a pair of spool hub members on said shaft having spaced opposed flanges, a pair of coacting spool flanges having inwardly offset central friction members disposed in abutting relation between said hub flanges, and friction driving disks disposed between said hub flanges and said friction members of said spool flanges.

3. In a fishing reel, the combination of a spool shaft, a pair of spool hub members sleeved upon said shaft and having spaced opposed flanges, said shaft being provided with a pinion constituting a supporting shoulder for one of said hub members, a nut threaded upon said shaft in supporting engagement with the other hub member, a pair of coacting spool flanges having inwardly offset central friction members disposed in abutting relation between said hub flanges, and resilient friction driving disks disposed between said hub flanges and said friction members of said spool flanges.

4. In a fishing reel, the combination of a spool shaft, a pair of spool hub members on said shaft having spaced opposed flanges, a pair of coacting spool flanges having inwardly offset central friction members disposed in abutting relation between said hub flanges, and resilient friction driving disks disposed between said hub flanges and said friction members of said spool flanges.

5. In a fishing reel, the combination of a casing, a spindle, a spool shaft on said spindle, a spool hub having spaced flanges, a pair of coacting spool flanges having inwardly offset hub engaging portions disposed between said hub flanges, and friction driving disks disposed between said hub flanges and said hub engaging portions of said spool flanges.

6. In a fishing reel, the combination of a spool shaft, a spool hub having spaced flanges, a pair of coacting spool flanges having inwardly offset hub engaging portions disposed between said hub flanges, and friction elements disposed between said hub flanges and said hub engaging portions of said spool flanges.

7. In a fishing reel, the combination of a cup-like casing having spaced notches in its edge, a spindle disposed centrally of said casing, an inwardly facing dished gear plate provided with a flange-like rim having tongues engaging said notches in said casing, a cupped spring drum embracing said gear plate and having an outwardly offset peripheral flange overhanging said casing and provided with an annular series of ratchet teeth, a pawl cooperating with said ratchet teeth and having a bowed spring arm secured to the inner side of said gear plate adjacent the periphery thereof, a winding spring disposed within said drum and connected at its outer end thereto, a driving gear mounted on said spindle and provided with a hub mounted on said gear plate and extending into said spring drum, said hub having a peripheral spring engaging lug with an eccentrically curved lift, the inner coil of the spring embracing the said hub and having a longitudinal slot adapted to receive said lug, said eccentrically curved lift of said lug acting to disengage the spring from the hub on the reverse rotation of said drum or hub, a spool rotatably mounted on said spindle, a driving connection for said driving gear to said spool, and a brake lever provided with a brake shoe, said casing having an opening to receive said brake lever, said pawl being disposed through said opening below said lever and provided with a finger piece.

8. In a fishing reel, the combination of a cup-like casing having spaced notches in its edge, a spindle disposed centrally of said casing, an inwardly facing dished gear plate provided with a flange-like rim having tongues engaging said notches in said casing, a spring drum having an outwardy offset peripheral flange overhanging said casing and provided with an annular series of ratchet teeth, a pawl cooperating with said ratchet teeth, a winding spring disposed within said drum and connected at its outer end thereto, a driving gear mounted on said spindle and provided with a hub mounted on said gear plate and extending into said spring drum, the inner coil of the spring engaging said hub, a spool rotatably mounted on said spindle, a driving connection for said driving gear to said spool, and a brake lever provided with a brake shoe, said casing having an opening to receive said brake lever, said pawl being disposed through said opening below said lever and provided with a finger piece.

9. In a fishing reel, the combination of a cup-like casing having spaced notches in its edge, a spindle disposed centrally of said casing, an inwardly facing dished gear plate provided with a flange-like rim having tongues engaging said notches in said casing, a cupped spring drum embracing said gear plate and having an outwardly offset peripheral flange overhanging said casing and provided with an annular series of ratchet teeth, a pawl cooperating with said ratchet teeth and having a bowed spring arm secured to the inner side of said gear plate adjacent the periphery thereof, a winding spring disposed within said drum and connected at its outer end thereto, a driving gear mounted on said spindle and provided with a hub mounted on said gear plate and extending into said spring drum, said hub having a peripheral spring engaging lug with an eccentrically curved lift, the inner coil of the spring embracing the said hub and having a longitudinal slot adapted to receive said lug, said eccentrically curved lift of said lug acting to disengage the spring from the hub on the reverse rotation of said drum or hub, a spool rotatably mounted on said spindle, and a driving connection for said driving gear to said spool.

10. In a fishing reel, the combination of a cup-like casing having spaced notches in its edge, a spindle disposed centrally of said casing, an inwardly facing dished gear plate provided with a flange-like rim having tongues engaging said notches in said casing, a spring drum having an outwardly offset peripheral flange overhanging said casing and provided with an annular series of ratchet teeth, a pawl cooperating with said ratchet teeth, a winding spring disposed within said drum and connected at its outer end thereto, a driving gear mounted on said spindle and provided with a hub mounted on said gear plate and extending into said spring drum, the inner coil of the spring engaging the said hub, a spool rotatably mounted on said spindle, and a driving connection for said driving gear to said spool.

11. In a fishing reel, the combination of a cup-like casing having spaced notches in its edge, a spindle disposed centrally of said casing, a spool, an inwardly facing dished gear plate provided with a flange-like rim having tongues engaging said notches in said casing, a spring drum embracing said gear plate and having an annular series of ratchet teeth, a pawl cooperating with said ratchet teeth and having a spring arm mounted on said gear plate, a motor spring disposed within said drum and having driving connection with said spool, and a brake lever provided with a brake shoe, said casing having an opening to receive said brake lever, said pawl being disposed through said opening below said lever and provided with a finger piece.

12. In a fishing reel, the combination of a cup-like casing having spaced notches in its edge, a spindle disposed centrally of said casing, a spool, an inwardly facing dished gear plate provided with a flange-like rim having tongues engaging said notches in said casing, a spring drum embracing said gear plate and having an annular series of ratchet teeth, a pawl cooperating with said ratchet teeth, a motor spring disposed within said drum and having driving connection with said spool.

13. In a fishing reel, the combination of a frame, a spool, a spring drum having ratchet teeth, a pawl cooperating with said ratchet teeth, a motor spring disposed within said drum and having driving connection with said spool, and a brake lever provided with a brake shoe, said casing having an opening to receive said brake lever, said pawl being disposed through said opening below said lever and provided with a finger piece.

14. In a fishing reel, the combination of a cup-like casing having spaced notches in its edge, a gear plate provided with a flange-like rim having tongues engaging said notches in said casing, a cupped spring drum having an upwardly offset peripheral flange overhanging said casing and provided with an annular series of ratchet teeth, a spring pawl cooperating with said ratchet teeth and having a finger piece at the outside of the casing, a motor spring within said drum, a spool, and driving connections for said spring to said spool.

15. In a fishing reel, the combination of a frame, a spool, a spring winding drum, and a driving gear having driving connection with said spool and provided with a hub projecting into said drum, said hub having a peripheral spring engaging lug with a cammed surface leading thereto, a spring within said drum, the inner coil of the spring embracing said hub and having a longitudinal slot adapted to receive said lug, said cammed surface acting to disengage the spring from the hub on reverse rotation of said drum or hub.

16. In a fishing reel, the combination of a frame, a spool, a spring winding drum, and a driving gear having driving connection with said spool and provided with a hub projecting into said drum, said hub having a peripheral spring engaging lug with a cammed surface leading thereto, a spring within said drum, the inner coil of the spring embracing said hub and having an opening adapted to receive said lug, said cammed surface acting to disengage the spring from the hub on reverse rotation of said drum or hub.

17. In a fishing reel, the combination of a frame, a spool within the frame, a spool driving spring, and driving connections for said spring to said spool including a driving member having a lug, the inner coil of the spring embracing said driving member and having an opening receiving the lug, said driving member having a part associated with the lug acting to disengage the spring on the reverse rotation of the driving member.

18. In a spring structure of the class described, the combination of a casing, a spool shaft, a spool comprising spool flanges having frictional driving connection with said shaft, a driving spring having driving connection with said spool shaft, a brake lever mounted on said casing and provided with a brake shoe coacting with one of said spool flanges, said brake lever having three spaced openings therein, a U shaped spring disposed with its inner arm through the inner opening of said brake lever and its outer arm through the intermediate opening of said brake lever, the inner arm of said spring having a laterally turned extension projecting within the casing and engaging said lever, a spring supporting stud on said casing engaging the inner arm of the spring adjacent its bight, the outer arm of the spring being provided with a slot, and a latch for holding said brake lever in inoperative position rockingly mounted in the intermediate opening of said brake lever and having a finger piece disposed through the opening thereof, said latch being disposed through said opening in the outer arm of said spring and having spaced notch-like keepers cooperating with the lower edge of said opening.

19. In a spring structure of the class described, the combination of a casing, a spool, a driving spring having driving connection with said spool, a brake lever mounted on said casing and provided with a brake shoe coacting with said spool, said brake lever having three spaced openings therein, a U shaped spring disposed with its inner arm through the inner opening of said brake lever and its outer arm through the intermediate opening of said brake lever, the inner arm of said spring having a laterally turned extension projecting within the casing and engaging said lever, a spring supporting stud on said casing engaging the inner arm of the spring adjacent its bight, the outer arm of the spring being provided with a slot, and a latch for holding said brake lever in inoperative position rockingly mounted in the intermediate opening of said brake lever and having a finger piece disposed through the outer opening thereof, said latch being disposed through said opening in the outer arm of said spring and having spaced notch-like keepers cooperating with the lower edge of said opening.

20. In a spring structure of the class described, the combination of a frame, a spool, a motor spring having driving connection with said spool, a brake lever mounted on said casing and provided with a brake shoe coacting with said spool, said brake lever having three spaced openings therein, a bowed spring mounted on said frame and disposed with its inner arm through the inner opening and its outer arm through the intermediate opening of said brake lever, the inner arm of said spring having a laterally turned end engaging said lever, the outer arm of the spring being provided with a slot, and a latch for holding said brake lever in inoperative position rockingly mounted in the intermediate opening of said brake lever and having a finger piece disposed through the outer opening thereof, said latch being disposed through said opening in the outer arm of said spring and having spaced notch-like keepers cooperating with the lower edge of said opening.

21. In a spring structure of the class described, the combination of a casing, a spool shaft, a spool comprising spool flanges having frictional driving connection with said shaft, a driving spring having driving connection with said spool shaft, a brake lever mounted on said casing and provided with a brake shoe coacting with one of said spool flanges, said brake lever having spaced openings therein, a bowed spring disposed with its inner arm through one opening of said brake lever and its outer arm through another opening of said brake lever, the inner arm of said spring having a laterally turned end portion engaging said lever, a spring supporting stud on said casing engaging the inner arm of the spring adjacent its bight, the outer arm of the spring being provided with a slot, and a latch for holding said brake lever in inoperative position mounted on said lever and operatively associated with the outer arm of said spring.

22. In a spring structure of the class described, the combination of a casing, a spool, a driving spring having driving connection with said spool, a brake lever mounted on said casing and provided with a brake shoe coacting with said spool, said brake lever having spaced openings therein, a bowed spring disposed with its inner arm through one opening of said brake lever and its outer arm through another opening of said brake lever, the inner arm of said spring having a laterally turned end portion engaging said lever, a spring supporting stud on said casing engaging the inner arm of the spring adjacent its bight, the outer arm of the spring being provided with a slot, and a latch for holding said brake lever in inoperative position mounted on said lever and operatively associated with the outer arm of said spring.

23. In a spring structure of the class described, the combination of a frame, a spool, a driving spring having driving connection with said spool, a brake lever mounted on said frame and provided with a brake shoe coacting with said spool, said brake lever having an opening therein, a bowed spring disposed with its inner arm through the opening of said brake lever, the inner arm of said spring having a laterally turned end portion engaging said lever, a spring support on said casing engaging the inner arm of the spring, the outer arm of the spring being provided with an opening, and a latch for holding said brake lever in inoperative position mounted on said lever and engaged in the opening in the outer arm of said spring.

24. In a spring structure of the class described, the combination of a frame, a spool, a driving spring having driving connection with said spool, a brake lever mounted on said frame and provided with a brake shoe coacting with said spool, said brake lever having an opening therein, a bowed spring mounted on said frame disposed with its inner arm through the opening of said brake lever, the inner arm of said spring having a laterally turned end portion engaging said lever, and a latch for holding said brake lever in inoperative position mounted on said lever and engaged with the outer arm of said spring.

25. In a fishing reel, the combination with a hub having a lug, of a spring having an inner coil provided with a longitudinal slot engaging said lug, the hub having a cammed surface leading to said lug so that when the hub is rotated in one direction the spring is automatically disengaged from the lug, the lug automatically engaging the spring upon rotation in the opposite direction.

26. In a fishing reel, the combination of a pair of hub members, a pair of spool members, and spring means disposed between said hub and spool members and acting to urge said spool members together in assembled relation and frictionally retard relative movement between said spool members and said hub members.

27. In a fishing reel, the combination of spool members, hub means therefor, and spring means acting to urge said spool members together in assembled relation and provide a frictional connection between said spool members and said hub means.

28. In a fishing reel, the combination of a cylindrical casing, a spring drum having an outwardly offset peripheral flange overhanging said casing and provided with an annular series of ratchet teeth, and a pawl cooperating with said ratchet teeth and having a finger piece projecting radially of said flange, said pawl comprising a spring arm mounted on said casing within said drum.

29. In a fishing reel, the combination of a spring drum having an external annular flange provided with ratchet teeth, and a pawl cooperating with said ratchet teeth, said pawl being fixed at its inner end and comprising a spring arm curved with and lying within said flange and terminating in a radial finger piece projecting externally of the flange.

SAMUEL G. RUSSELL.
FRANK BURDICK.